United States Patent [19]

Garner

[11] Patent Number: 5,004,029

[45] Date of Patent: Apr. 2, 1991

[54] SAW TABLE APPARATUS

[76] Inventor: William C. Garner, P.O. Box 552, Tonganoxie, Kans. 66086

[21] Appl. No.: 509,709

[22] Filed: Apr. 16, 1990

[51] Int. Cl.$^5$ .......................... B25H 1/16; B25H 1/06
[52] U.S. Cl. .................................... 144/287; 83/648; 83/859; 144/286 R; 108/28; 108/92; 108/101; 269/901
[58] Field of Search ................. 83/648, 574, 477, 859; 108/92, 101, 28, 33, 48, 97; 269/901; 144/286 R, 287

[56] References Cited

U.S. PATENT DOCUMENTS

| | | | |
|---|---|---|---|
| 4,328,846 | 5/1982 | Hanson | 144/287 |
| 4,561,336 | 12/1985 | Davis | 144/287 |
| 4,827,819 | 5/1989 | O'Banion et al. | 144/287 |
| 4,860,807 | 8/1989 | Vacchiano | 144/286 R |
| 4,874,025 | 10/1989 | Cleveland | 144/286 R |

Primary Examiner—W. Donald Bray
Attorney, Agent, or Firm—Leon Gilden

[57] ABSTRACT

An apparatus including a central planar table plate, with a first and second wing plate member pivotally mounted at each end of the saw table plate, wherein each wing plate includes an outwardly extending plurality of tubes directed therefrom, wherein each of the tubes telescoping receives a leg of a "U" shaped member therewithin secured to the tubes by collets mounted at free ends of the tubes spaced from each of the wings. The tubes include a cross brace spaced rearwardly of the collet, with a sleeve pivotally mounted about each of the cross braces. The sleeve includes a leg telescopingly received within an underlying tube member. The underlying tube member of each leg is pivotally mounted to a framework, wherein the framework is arranged parallel and underlying the plate member mounted to legs extending downwardly from the plate member.

1 Claim, 5 Drawing Sheets

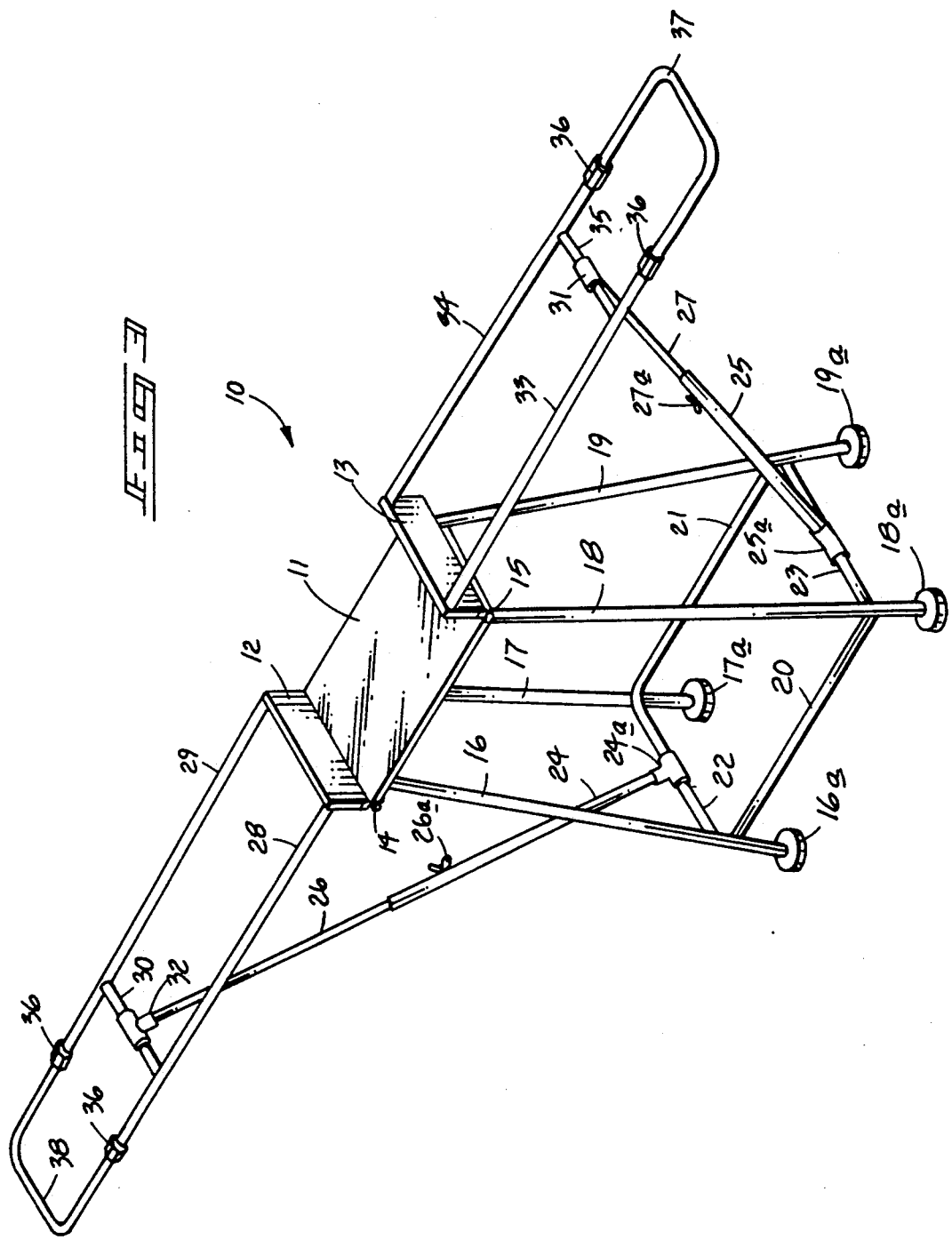

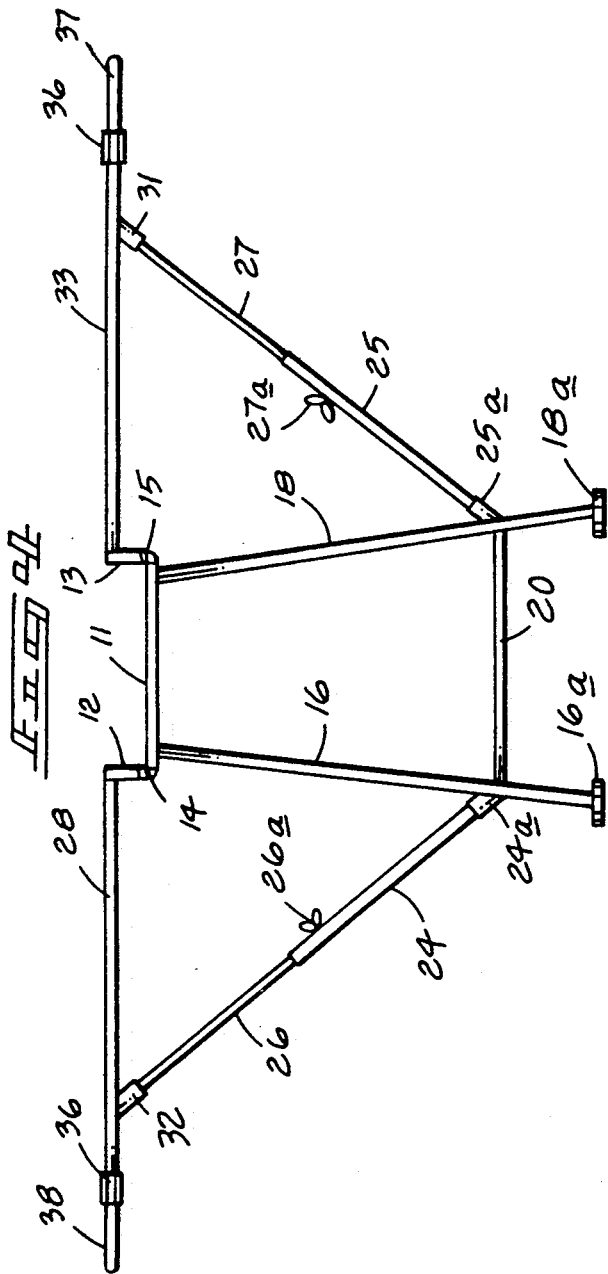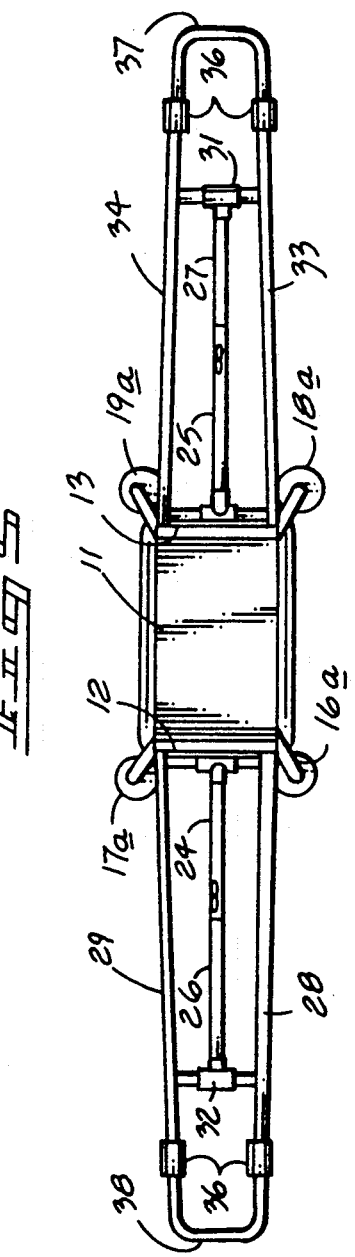

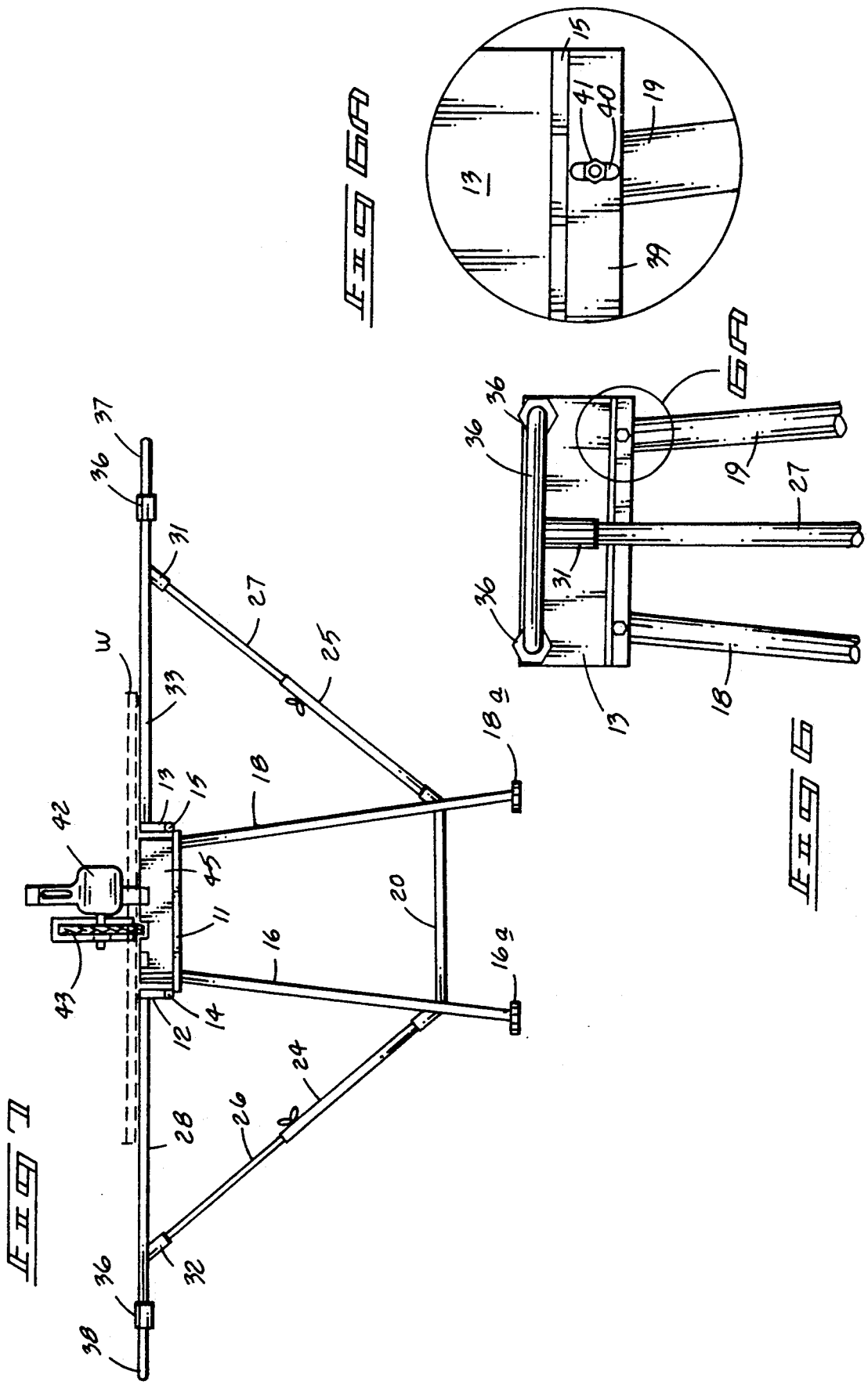

SAW TABLE APPARATUS

BACKGHROUND OF THE INVENTION

1. Field of the Invention

The field of the invention relates to saw tables, and more particularly pertains to a new and improved saw table apparatus wherein the same is provided with spaced wing members that, when in a raised position, provide a recessed support plate for reception of a saw blade directed at a plane underlying the wings.

2. Description of the Prior Art

Portable saw table apparatus has been provided by the prior art, wherein it is frequently desirable in prior art organizations to utilize a saw that is directed across a workpiece. The portable saw tables of the prior art have not provided recessed supports, as provided by the instant invention, which permits a workpiece to be directed overlying an underlying support to permit acceptance of a saw blade therewithin. Further, the recessed planar support of the instant invention permits positioning of portable sawing apparatus such as power miter saws and the like. Examples of the prior art includes U.S. Pat No. 4,640,326 to Hewitt wherein a table saw, including a planar surface, includes a framework mounted longitudinally and spaced from the table saw, wherein the framework is pivotal to a horizontal orientation from a vertical orientation relative to the saw table for use.

U.S. Pat. No. 4,236,599 to Luff, et al. sets forth a stool, wherein a plurality of frames are angularly oriented relative to one another, wherein a work support surface includes a lateral plate pivotal to an aligned orientation relative to the support surface.

U.S. Pat. No. Re. 30,689 To Gray, et al. provides a foldable bench utilized with a portable hand-held circular saw, wherein the bench is collapsible permitting a hand saw to be mounted underlying a saw table support surface.

U.S. Pat. No. 4,320,678 to Volk sets forth a portable power tool accessory table wherein an adjustable track accomodates various saws, such as saber saws, circular saws, and routers.

U.S. Pat. No. 4,566,510 to Bartlett, et al. provides a saw table surface slidably mounted to a plurality of spaced rails, including further plate members mounted on the rails for association with the saw table surface.

As such, it may be appreciated that there continues to be a need for a new and improved saw table apparatus wherein the same addresses both the problems of ease of use, as well as effectiveness in construction providing a saw table that provides conveniently erected wings members relative to a table support surface, wherein the table support surface underlies aligned planes of the wing members.

SUMMARY OF THE INVENTION

In view of the foregoing disadvantages inherent in the known types of saw table apparatus now present in the prior art, the present invention provides a saw table apparatus wherein the same permits a manually manipulatable table, wherein a central support of the table is arranged to underlie support planes of wing members pivotally mounted adjacent the support table. As such, the general purpose of the present invention, which will be described subsequently in greater detail, is to provide a new and improved saw table apparatus which has all the advantages of the prior art saw table apparatus and none of the disadvantages.

To attain this, the present invention provides an apparatus including a central planar table plate, with a first and second wing plate member pivotally mounted at each end of the saw table plate, wherein each wing plate includes an outwardly extending plurality of tubes directed therefrom, wherein each of the tubes telescopingly receives a leg of a "U" shaped member therewithin secured to the tubes by collets mounted at free ends of the tubes spaced from each of the wings. The tubes include a cross brace spaced rearwardly of the collet, with a sleeve pivotally mounted about each of the cross braces. The sleeve includes a leg telescopingly received within an underlying tube member. The underlying tube member of each leg is pivotally mounted to a framework, wherein the framework is arranged parallel and underlying the plate member to legs extending downwardly from the plate member.

My invention resides not in any one of these features per se, but rather in the particular combination of all of them herein disclosed and claimed and it is distinguished from the prior art in this particular combination of all its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate the conception, upon which this disclusure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved saw table apparatus which has all the advantages of the prior art saw table apparatus and none of the disadvantages.

It is another object of the present invention to provide a new and improved saw table apparatus which may be easily and efficiently manufactured and marketed.

It is a further object of the present invention to provide a new and improved saw table apparatus which is of a durable and reliable construction.

An even further object of the present invention is to provide a new and improved saw table apparatus which is susceptible of a low cost of manufacture with regard to both materials and labor, and which accordingly is then susceptible of low prices of sale to the consuming public, thereby making such saw table apparatus economically available to the buying public.

Still yet another object of the present invention is to provide a new and improved saw table apparatus which provides in the apparatuses and methods of the prior art some of the advantages thereof, while simultaneously overcoming some of the disadvantages normally associated therewith.

Still another object of the present invention is to provide a new and improved saw table apparatus wherein the same permits selective positioning of wing members relative to a central surface of a saw table to accept a saw blade directed through a workpiece arranged in the plane of the wing members of the apparatus.

These together with other objects of the invention, along with the various features of novelty which characterize the invention, are pointed out with particularity in the claims annexed to and forming a part of the disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an isometric illustration of the instant invention.

FIG. 4 is an orthographic side view of the instant invention, taken in elevation.

FIG. 5 is an orthographic top view of the instant invention.

FIG. 6 is an orthographic end view of the instant invention.

FIG. 6a is an orthographic view, taken in elevation, of the portion 6a as indicated in FIG. 6.

FIG. 7 is an orthographic side view of the instant invention mounting a power miter saw within the central support plate of the instant invention.

DESCRIPTION OF THE PREFERRED EMBODIMENT

Figure 1:
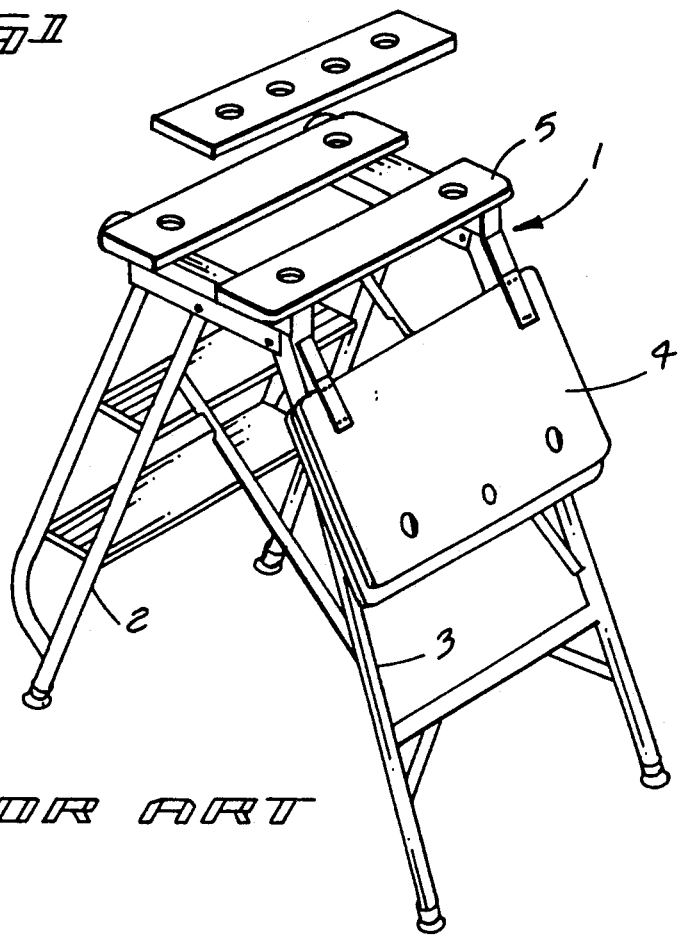
FIG. 1 is an isometric illustration of a prior art saw table apparatus.

With reference now to the drawings, and in particular to FIGS. 1 to 9 thereof, a new and improved saw table apparatus embodying the principles and concepts of the present invention and generally designated by the reference numeral 10 will be described.

Figure 2:
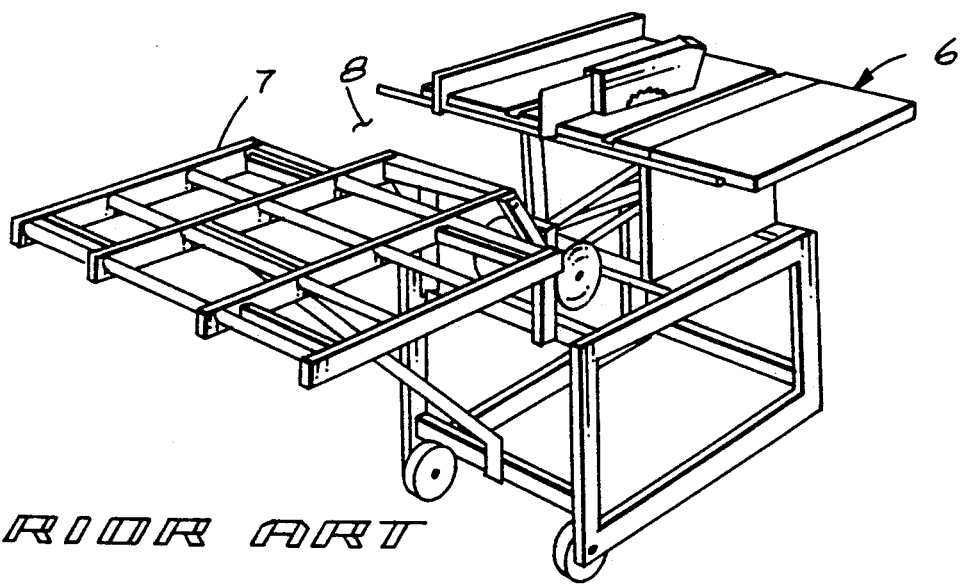
FIG. 2 is an isometric illustration of a further example of a prior art saw table apparatus.

FIG. 1 illustrates a prior art support table 1, wherein a first and second rectangular framework 2 and 3 respectively is pivotally mounted underlying a central support 5, with a wing member 4 pivotally mounted to the central support to support an extended work support surface. FIG. 2 illustrates a saw table 6, wherein a framework 7 is spaced from the table 6 by a gap 8, wherein the framework 7 is pivotal from a vertical to a horizontal orientation for support of elongate workpieces thereon.

Figure 9:
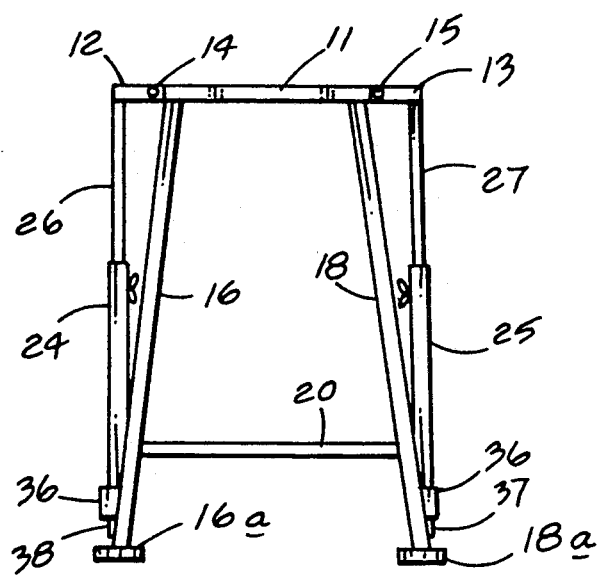
FIG. 9 is an orthographic side view of the instant invention with the wing members arranged in a downwardly pivoted orientation.

More specifically, the saw table apparatus 10 of the instant invention essentially comprises a rigid table plate member 11, with spaced parallel ends, with a first wing plate 12 and a second wing plate 13 pivotally mounted to the opposed ends of the plate member 11 by a respective first and second elongate hinge 14 and 15. When the first and second wing plates 12 and 13 are in a horizontal position, as opposed to the vertical orientation as illustrated in FIG. 3, the wing plates define an aligned planar support surface in a manner as illustrated in FIG. 9 for example. A first, second, third, and fourth elongate leg member 16, 17, 18, and 19 respectively are directed downwardly from a bottom surface of the plate member 11 defining a trapezoidal parrallelepiped. The lower terminal ends of the leg members 16-19 include respective cylindrical feet defining a first, second, third, and fourth cylindrical foot 16a, 17a, 18a, and 19a of the respective leg members 16-19, wherein the cylindrical feet define a common support plane parallel to the top surface of the plate member 11. A first side rung 20 is directed between the first and third leg member, with a second side rung 21 fixedly mounted to and directed between the second and third leg members. A first end rung 22 is mounted between the first and second leg members and a second end rung 23 is fixedly mounted between the third and fourth leg members, wherein the rungs 20-23 define a single plan parallel to the top surface of the plate member 11 to effect stability, as well as defining a bearing surface for associated tube junction sleeves 24a and 25a respectively mounted to the respective first and second end rungs 22 and 23. The first tube junction sleeve 24a mounts a first tube 24 oriented orthogonally to the first end rung 22, while the second tube junction sleeve 25a mounts a second tube 25 orthogonally relative to the second end rung 23. The first and second tubes 24 and 25 telescopingly receive a respective first and second wing leg member slidably and frictionally therewithin, while a respective first and second fastener 26a and 27a directed through the first and second tubes 24 and 25 may be optionally employed to maintain the respective first and second wing leg members 26 and 27 in a desired orientation relative to the respective first and second tubes.

The first and second wing plates 12 and 13 respectively mount first and second wings rigidly to exterior side surfaces of the wing plates. The wings define a planar top surface, wherein the planar top surfaces are aligned relative to one another of the spaced wings, and are spaced above and parallel to the top surface of the plate member 11. The first wing mounted to the first wing plate 12 includes a first and second respective horizontal tube 28 and 29 fixedly mounted to and extending orthogonally from an exterior surface of the first wing plate 12 directed rearwardly thereof. A rotatable locking collet 36 is mounted at each rear terminal end of the first and second horizontal tubes 28 and 29 formed of an equal lineal length. The first and second horizontal tubes 28 and 29 slidably receive the legs of a first "U" shaped extension member 38 therewithin to provide effective lengthening or shortening of the wing defined by the first and second horizontal tubes and the first extension member 38 wherein, as illustrated, the first and second horizontal tubes 28 and 29 are arranged parallel to one another. A first brace 30 is mounted orthogonally between the first and second horizontal tubes 28 and 29 rotatably mounting a first leg member junction sleeve 32 formed to an upper terminal end of the first wing leg member 26 to permit relative rotation of the first leg member junction sleeve 32 during collapse of the first wing member and reception of the first wing leg member 26 within the first tube 24. Similarly, spaced parallel third and fourth horizontal tubes 33 and 34 of equal length are orthogonally fixedly mounted to a rear terminal face of the second wing plate 13, with the rotatable locking collets 36 mounted to rearward and free terminal ends of the third and fourth horizontal tubes, wherein the tubes through the collets receive the legs of the second "U" shaped extension member 37 therewithin to permit extension of the support surface of the second wing, as defined by the third and fourth horizontal tubes 33 and 34 and the second "U" shaped extension member 37. A second brace 35 rotatably mounts a second leg member junction sleeve 31 that in turn is fixedly mounted to an upper terminal end of the second wing leg member 27, for use in a manner as described relative to the first wing member.

Reference to FIGS. 6 and 6a illustrates that the elongate leg members 16-19 each include an upper terminal end formed with a fastener 41 that is directed through an adjusting plate 39 mounted orthogonally to each end of the plate member 11 to permit vertical adjustment of the leg members 16-19 individually through an elongate slot 40 oriented vertically relative to the top surface of the plate member 11 to permit vertical height adjustment of the leg members relative to the plate member 11.

FIG. 7 illustrates the use of a power miter saw head 42 mounted to a support base 47 that is received on the top surface of the plate member 11. Accordingly, a workpiece directed about a top surface of the side wing members, as illustrated in FIG. 7, permits the workpiece "W" to be directed past the power miter saw 42 and the associated blade 43. Understandably, the base 45, as illustrated, is of a height substantailly equal to the defined height of each of the wing plates 12 and 13.

Figure 8:
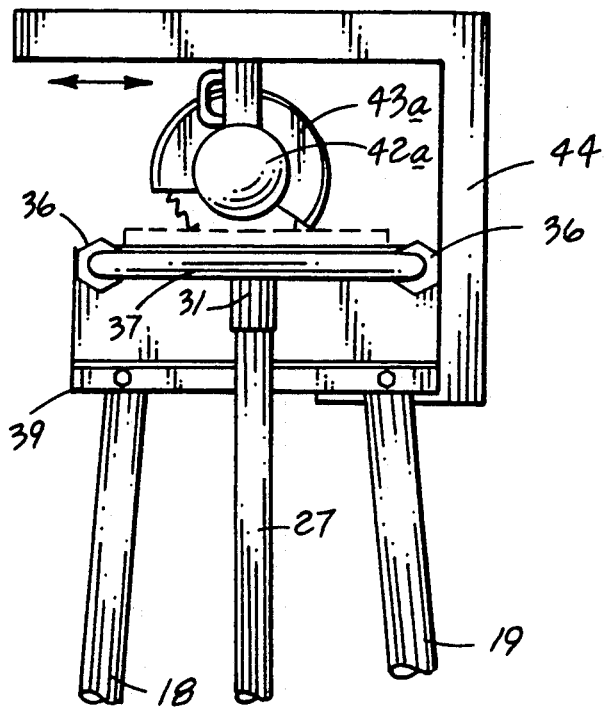
FIG. 8 is an orthographic end view of the instant invention with a power radial arm saw mounted overlying the support table of the instant invention.

FIG. 8 illustrates the use of a "U" shaped yoke 44, with a bottom leg of the yoke fixedly mounted to a bottom surface of the plate member 11, with an upper leg of the yoke arranged to and overlying the top surface of the plate member 11, wherein the top leg of the yoke slidably mounts a radial arm saw head member 43a operative through an associated power motor 42a for use of the organization as a radial arm saw device.

FIG. 9 illustrates the side wing members arranged in a second or vertical orientation relative to the table plate member 11 defining a single support surface, wherein the top surface of the plate member 11 is coextensive with the interior faces of the first and second wing plates 12 and 13.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A saw table apparatus comprising, in combination, a table plate member defining a planar top surface spaced from and overlying a planar bottom surface, and a first wing plate hingedly mounted to the plate member at a first end of the plate member arranged orthogonally to the plate member in a first position and aligned with the plate member in a lowered second position, and a second wing plate hingedly mounted at a second end of the plate member opposed to the first end, wherein the second end is arranged parallel to the first end, with a second elongate hinge pivotally mounting the second wing plate to the second end of the plate member, wherein the second wing plate is arranged orthogonally relative to the plate member in a first position and aligned with the plate member in a second position, and a first, second, third, and fourth leg member each integrally mounted and downwardly extending from the bottom surface of the plate member, and each leg member of an equal length to support the plate member at a spaced relationship relative to lower terminal ends of each leg member, and a rung framework fixedly mounted to the first, second, third, and fourth leg members, wherein the rung framework defines a rung plane underlying and parallel to the top surface of the plate member, the rung framework including a first end rung underlying and parallel the first end of the plate member, and a second end rung underlying and parallel the second end of the plate member, and the first wing plate includes a first framework mounted orthogonally to and extending exteriorly of a rear surface of the first wing plate, and a second framework mounted orthogonally to and extending exteriorly of a rear surface of the second wing plate, wherein the first and second framework defines a first and second framework plane, and the first and second framework planes are aligned coextensively relative to one another when the first and second wing plates are in the first position, wherein the first and second framework planes are arranged to and spaced above the top surface of the table plate member when the first and second frameworks are in the raised first position, and the first framework includes a first and second tube each parallel relative to one another and defined by an equal length, wherein each first and second tube are fixedly mounted to the rear surface of the first wing plate, and the first and second tubes include a friction collet mounted to each first and second tubes from the first wing plate, and the first and second tubes each receive through the respective friction collet mounted to each first and second tube a first "U" shaped extension member leg of a first "U" shaped extension member reciprocatably mounted within the first and second horizontal tube, and the second framework includes a third and fourth horizontal tube fixedly and orthogonally mounted to the rear surface of the second wing plate, and the third and fourth horizontal tube includes a friction collet mounted to each free terminal end of each horizontal tube spaced from the second wing plate, and the third and fourth horizontal tube receives a second "U" shaped extension member leg of a second "U" shaped extension member through each collet associated with each third and fourth horizontal tube, and the first and second horizontal tube includes a first brace orthogonally and fixedly mounted between the first and second tube, including a first wing leg member pivotally mounted to the first brace, the first wing leg member telescopingly received within a first tube leg, wherein the first tube leg is pivotally mounted at its lower terminal end to the first end rung, and the third and fourth horizontal tube includes a second brace fixedly and orthogonally mounted therebetween, including a second wing leg member pivotally mounted at its upper terminal end to the second brace, and wherein a lower terminal end of the second wing leg member telescopingly receivable within a second tube leg, the second tube leg including a lower terminal end, the lower terminal end of the second tube leg pivotally mounted orthogonally relative to its longitudinal length to the second end rung, and further including a "U" shaped yoke, the "U" shaped yoke including a bottom leg fixedly mounted to the bottom surface of the plate member, and a second leg spaced above and parallel to the top surface of the plate member, and the second leg slidably receiving a saw therealong, wherein the "U" shaped yoke is removably mounted to the plate member, and the apparatus further includes a power miter saw assembly mounted on the top surface of the plate member, wherein the power miter saw includes a support base, the support base defined by a predetermined height, the predetermined height equal to a further height defined by each first and second wing plate, the power miter saw spaces above the first and second framework when mounted on the plate member.

* * * * *